US011060401B2

(12) United States Patent
Hazen et al.

(10) Patent No.: US 11,060,401 B2
(45) Date of Patent: Jul. 13, 2021

(54) PROCESS AND SYSTEM FOR IMPROVED RECLAMATION OF MINED LANDS

(71) Applicant: HPS Enterprises II, LLC, Keystone Heights, FL (US)

(72) Inventors: James Julian Hazen, Lakeland, FL (US); Hassan El-Sayed El-Shall, Gainesville, FL (US); John Raymond Schmedeman, Little Rock, AR (US)

( * ) Notice: Subject to any disclaimer, the term of this patent is extended or adjusted under 35 U.S.C. 154(b) by 0 days.

(21) Appl. No.: 16/411,860

(22) Filed: May 14, 2019

(65) Prior Publication Data

US 2019/0264562 A1 Aug. 29, 2019

Related U.S. Application Data

(62) Division of application No. 15/632,287, filed on Jun. 23, 2017, now Pat. No. 10,337,325.

(60) Provisional application No. 62/354,367, filed on Jun. 24, 2016.

(51) Int. Cl.
| | |
|---|---|
| *E21C 41/32* | (2006.01) |
| *C02F 1/52* | (2006.01) |
| *C02F 9/00* | (2006.01) |
| *E02B 11/00* | (2006.01) |
| *E21C 41/00* | (2006.01) |
| *C02F 11/14* | (2019.01) |
| *B01D 21/26* | (2006.01) |

(52) U.S. Cl.
CPC ............... *E21C 41/32* (2013.01); *C02F 1/52* (2013.01); *B01D 21/267* (2013.01); *B01D 2311/02* (2013.01); *C02F 9/00* (2013.01); *C02F 11/14* (2013.01); *E02B 11/00* (2013.01); *E21C 41/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,723,042 A | * | 3/1998 | Strand | .................... C10G 1/045 |
| | | | | 208/390 |
| 8,349,188 B2 | * | 1/2013 | Soane | ....................... C02F 1/40 |
| | | | | 210/666 |
| 2012/0313038 A1 | * | 12/2012 | Laros | ...................... C02F 11/14 |
| | | | | 252/194 |

* cited by examiner

*Primary Examiner* — Kyle Armstrong
(74) *Attorney, Agent, or Firm* — Arrubla Taylor PA; Andres F. Arrubla, Esq.

(57) ABSTRACT

A process and associated system for the improved reclamation of disturbed lands (e.g., mined lands) is disclosed. In particular, the system including a dewatering cyclone, a screw classifier, and a dewatering apparatus (e.g. a dewatering belt) arranged in series to enable rapid and cost effective dewatering of slurries containing dilute clay and sand tailings to create an improved engineered reclamation material (ERM). The ERM formed by the controlled combining of dewatered sand tailings with dilute clay slurry and with a flocculant and overburden. The ratio of clay:sand:overburden of the ERM may be achieved by balancing the solid content (Cw) and water content (1−Cw) materials of the clay slurry, sand tailings and overburden. In some embodiments, the system may include at least one additional component, such as, for example, static screen(s), centrifuge(s), vibrating screens, drum screens, belt screens, belt filters, and/or other liquid-solid separation devices.

8 Claims, 7 Drawing Sheets

PROCESS AND SYSTEM FOR IMPROVED RECLAMATION OF MINED LANDS

RELATED APPLICATIONS

This application claims priority as a Divisional Application to U.S. Non-Provisional patent application Ser. No. 15/632,287, entitled "PROCESS AND SYSTEM FOR IMPROVED RECLAMATION OF MINED LANDS," filed on Jun. 23, 2017; which in turn claims priority to U.S. provisional patent application Ser. No. 62/354,367 which was filed on Jun. 24, 2016 and is titled "PROCESS FOR IMPROVED RECLAMATION OF MINED LANDS", the contents of which are relied upon and incorporated by reference.

BACKGROUND OF THE DISCLOSURE

Field of the Disclosure

The present invention relates to a process and system for the improved reclamation of mined lands. More particularly, the invention relates to an improved mining process that can be used to reduce the environmental impact of a mining operation and the length of time required to achieve reclamation of mined lands.

Background and Related Art

The mining of minerals is not only vital for the economic growth of communities but has also been recognized to be the building blocks of modern life. While the mining of minerals will likely continue to be essential in the food, health, energy, and communications industries, ever-evolving developments in the mining industry are desired to continue to reduce environmental impact from it and adapt to changes in the environment, demand, and technology. Relatively recent efforts to preserve and reclaim mined lands have resulted in the development of different techniques and mining technology to overcome challenges common to all mining practices or specific to the type of mining or mineral being extracted and processed.

In particular to the phosphate mining industry, for example, the inability to consolidate the dispersed by-product sand tailings and clays to a consistency suitable for use as a reclamation material is a problem which has bedeviled the industry since its inception. Several recent studies and efforts have taken place in search for improved processes that may overcome or reduce the consolidating of the dispersed by-products' ineffectiveness in furthering reclamation of the mined lands. The following studies and publications help set forth the state of the art and related processes recently developed.

State-of-the-Art of Phosphatic Clay Dewatering and Disposal Techniques:

*Volume 1—A Review of Phosphatic Clay Dewatering Research* (02-17-021*Final*), surveys the current state of technology and the various research efforts that have been undertaken to dewater the dilute phosphatic clays generated in the production of phosphate rock. The research described includes early dewatering experiments, fundamental studies of clays and of flocculation, and minor dewatering techniques such as freeze-thaw methods, the ANDCO process, moving screens, sand wick, crust development, and overburden pumping. Some methods under development, such as, the Estech sand-clay mix process using the Enviro-Clear thickener, sand-clay sandwiching, dredge mix, dredge process, and the sand-spray process are also mentioned. Developing technology for dewatering phosphatic clays also is described, including the Bureau of Mines rotary trammel method and the Gardinier process.

Related Efforts—Phosphatic Clay Workshop (02-020-012).

*Gardinier, Inc. Superflocculation Process for Phosphatic Clay Disposal*, by Dr. Steven W. Clark, pp 65-74, describes a method for flocculating, thickening, and super flocculating all of the clays generated which it claims to result in improved rates of dewatering.

*Estech. Inc. Plant Scale Disposal of Phosphatic Clay Flocculation with Sand Mix*, by D. J. Raden, pp 75-81, describes a low volume plant design developed to dispose of these clays by their chosen technology, "flocculation and sand mixing". This unit design was intended, but unsuccessful, in eliminating the need for construction of conventional clay storage dams at the mine.

*Waste Clay Disposal in Mine Cuts* (81-02-006), W David Carrier III describes research relating to the IMC's field experiment in efforts to develop new design techniques in order to apply this method to other mining situations which involve different clay properties, filling rates, pit depths, side slopes, sand-clay ratios, and seepage conditions. However, the research was found that the disposal of thickened clay in mine cuts did not offer a significant improvement in the rate of consolidation compared to placement of thickened clay in a large pond with the same depth.

*Development and Pilot-Scale Demonstration of Deep Cone Paste Thickener for Phosphatic Clay Disposal: Phase II* (02-177-244Final), describes a process that—while appearing promising in its feasibility of the dual polymer/deep cone technology for treating high-plasticity materials, in enabling the applicability of the process to waste clay only without adding extra sand, and showing economic viability of the flocculation-based deep cone paste technology for waste clay disposal in the phosphate industry—the processing rate is likely deemed too low, and the capital and operating costs to be too high for industry adoption.

*The Mined Lands Agricultural Research Project: Summary of Experiments and Extension Recommendations* (03-193-128Final), describes reclaimed phosphatic clays being able to support intensive agricultural production systems. The study further stated that phosphatic clay can be both highly fertile and productive due at least in part to its physical and chemical characteristics, such as relatively high water holding capacity and inherently high plant nutrient supply, which are superior to surrounding unmined sandy soils. Further, that phosphatic clay does contain elevated levels of radionuclides and thus the naturally occurring radionuclide levels are not passed to plants and animals in the human food chain—thus, posing minimal risk to human or animal health.

*Production of High-Value Cash Crops on Mixtures of Sand Tailings and Waste Phosphatic Clays* (03-075-0SOFinal), points out the impact of mandatory reclamation and need for the phosphate mining industry to utilize/prepare mined lands for agriculture.

In particular to the study of clay consolidation and rapid clay dewatering, the Florida Industrial and Phosphate Research Institute (FIPR) has been publishing a significant number of reports over the years dealing with clay dewatering, clay consolidation, clay pond management, and the use of clay in reclamation. In particular, two FIPR reports examining rapid clay dewatering are summarized below:

Report 02-177-244: described pilot testing of a deep cone thickener at the South Pasture mine demonstrated that slurry containing 0.63 parts sand and 1 part clay could be thickened to a paste in which the water to clay ratio was 1.75. The reported test conditions indicated a thickener flux rate of about 0.021 tph/ft2. After nine months storage in a 25-feet tall column, the paste further consolidated and the water to clay ratio had been reduced to 1.04.

02-168-232: described a flowsheet including a cyclone, clarifier, paste thickener, and a static screen which were pilot tested to dewater slurry containing dilute clay and sand. The cyclone functioned well; however, problems with the clarifier and thickener were reported. Foremost in paste thickener design challenges exists, such as, for example, in the discharging and transporting the undertow, preventing rake stoppage and/or discharge plugging that are associated with slurry having high viscosity and yield stress. The power required to pump the resultant high-viscosity slurry can also be a significant drawback.

The aforementioned studies and publications which are incorporated herein by reference not only to show the current state of the art and recent related efforts, but also to help highlight and explain some of the shortcomings and needs for new processes. As it can be apparent by the studies and publications, a need for new processes and technology exists for:

A cost effective process solution that is able to achieve dewatering at acceptable rates;

A cost effective process solution that does not impose limitations on handling requirements and can be useful for a significant portion of the mines' life;

A cost effective process solution that is able to achieve acceptable rate of consolidation compared to placement of thickened clay under similar conditions;

A cost effective process solution that enables faster reclamation of mined lands for agricultural and/or biofuel purposes;

A cost effective process solution that can reduce water consumption and is environmentally sound;

An effective process solution that may help eliminate the need for pH adjustment for a reclamation material; and A cost effective process solution that enables, at least in part, improved economic waste tailings disposal techniques and utilization of the phosphatic clay.

Accordingly, new processes that achieve/enable at least some of the aforementioned while remaining economically and environmentally sound are highly desirable in at least the mining industry.

SUMMARY OF THE DISCLOSURE

The foregoing needs are met, to a great extent, by the invention, disclosing a new process and associated system for processing phosphatic clay in an economically practical and environmentally sound manner to achieve accelerated reclamation of mined lands. In particular, the invention is intended to solve the challenges by achieving, at least in part: a method for improving the reclamation of a disturbed land including forming sand clay slurry having a sand tailing and a clay slurry. The sand clay slurry can be flocculated using a flocculant polymer dictated by the type of clay. The flocculant polymer may be an organic or non-organic high molecular anionic, cationic, non-ionic, or a combination thereof. The flocculated sand clay slurry can be dewatered to generate an engineered reclamation material (ERM) having a paste consistency for backfilling the mined land by adding overburden to the dewatered flocculated sand clay slurry.

In some embodiments, the dewatering of the flocculated sand clay slurry can be performed using at least a dewatering cyclone, a screw classifier and a dewatering apparatus (e.g. a dewatering belt) in series. In additional embodiments, the dewatering system may also include one or more screens. For example, in some embodiments an additional static screen may be positioned between the dewatering cyclone and the screw classifier at an angle between 15 degrees and 60 degrees and having a wire opening profile that is between 1 mm and 0.75 mm. In accordance with some aspects, the pressure of the cyclone may be controlled during the dewatering step. In some preferred embodiments, the pressure is controlled by including a motor having a variable frequency drive. Other embodiments may control cyclone pressure by additionally or alternatively including, for example, one or more sheaves, v-belts, and restrictions on the discharge of the pump.

The overburden added to generate the ERM may be added to the dewatered flocculated sand clay slurry using a screw feeder. In some embodiments, the motor of the screw feeder may be controlled, for example, using a variable frequency drive motor. In addition or alternatively, the overburden may be added using a vibrating pan feeder or a rotating table. The clay slurry of the ERM formed may have, for example, a water to clay ratio that may include less than about 1.22 with a clay solids content that may be greater than about 45%. Moreover, in accordance with additional aspects, the clay:sand:overburden of the ERM can be about 1 part clay, 0.5-2.5 parts sand tailings, and less than 5 parts overburden. In some phosphate mining reclamation embodiments, the clay:sand:overburden ratio may be, for example, of about 1 part clay, 1-2 parts sand tailings, and less than 3 parts overburden. According to yet additional aspects of the disclosure, the ratio of the engineered reclamation material can be achieved by balancing the solid content (Cw) and water content (1−Cw) materials of the clay slurry, sand tailings and overburden during the process. The material balances may be controlled, for example, by balancing the feed-rates of one or more of: the sand tailing, the clay slurry, and the overburden.

In accordance with additional aspects of the disclosure, a system for efficiently generating an improved engineered reclamation material suitable for the reclamation of a disturbed (e.g. mined) land is disclosed. The system including, in series; a dewatering cyclone configured to controllably receive and dewater (e.g., using a motor including a variable frequency drive) a flocculated sand clay slurry, a screw classifier configured to receive the flocculated sand clay slurry and separate a waste overflow from the flocculated sand clay slurry, and a dewatering apparatus (e.g. dewatering belt) configured for the addition of an overburden to the flocculated sand clay slurry. In embodiments in which a dewatering belt is implemented, the dewatering belt may include, for example, a plurality of idler bars configured to promote the dewatering. Other components that may be included in the system can include, for example, a static screen at an angle between about 15 degrees and 60 degrees and having a profile wire opening between about 1 mm and 0.75 mm positioned between the dewatering cyclone and the screw classifier. Additionally, in some embodiments, a screw feeder having a motor with variable frequency drive, or other means of control, may be used to add the overburden to the dewatered flocculated sand clay slurry on the dewatering belt.

In accordance with yet additional aspects of the disclosure, a process for generating an engineered reclamation material with high permeability and low plasticity that can be used to enable more rapid and improved land reclamation of mined lands is disclosed. The process comprising: mixing a clay slurry, a flocculant, a sand tailing and an overburden using controlled feed rates and resulting in an engineered reclamation material and resulting waste based on solid content (Cw) and water content (1−Cw) properties. In some embodiments, e.g., the content of the engineered reclamation material may be of about 60-70% solids. In some embodiments, the recovery of solids of the feed to the product may be determined by calculating $Cwp/Cwf \times (Cwf-Cww)/(Cwp-Cww)$. The recovery of water from the feed to the product may be determined by calculating $(1-Cwp)/(1-Cwf) \times ((1-Cwf)-(1-Cww)/(Cwp-Cww)$ where Cwf is the solids concentration of the feed slurry, Cwp is the solids concentration of the product slurry, and Cww is the solids concentration of the waste slurry. According to some aspects, the clay of the engineered reclamation material formed can have a water to clay ratio that is less than about 1.22 with a clay solids content that is greater than about 45%. In some exemplary embodiments, the materials ration may be of about 1 part clay, 0.5-2.5 parts sand tailings, and less than 5 parts overburden. In some phosphate mining reclamation embodiments, the clay:sand:overburden ratio may be, for example, of about 1 part clay, 1-2 parts sand tailings, and less than 3 parts overburden.

There has thus been outlined, rather broadly, certain aspects of the invention in order that the detailed description thereof herein may be better understood, and in order that the present contribution to the art may be better appreciated. There are, of course, additional aspects of the invention that will be described below and which will also form the subject matter of the claims appended hereto.

In this respect, before explaining at least one aspect of the invention in detail, it is to be understood that the invention is not limited in its application to the details of construction and to the arrangements of the components/process steps set forth in the following description or illustrated in the drawings. The invention may be capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

The above mentioned features and aspects of the disclosure will become more apparent with reference to the following description taken in conjunction with the accompanying drawings in which.

DETAILED DESCRIPTION

Figure 1:
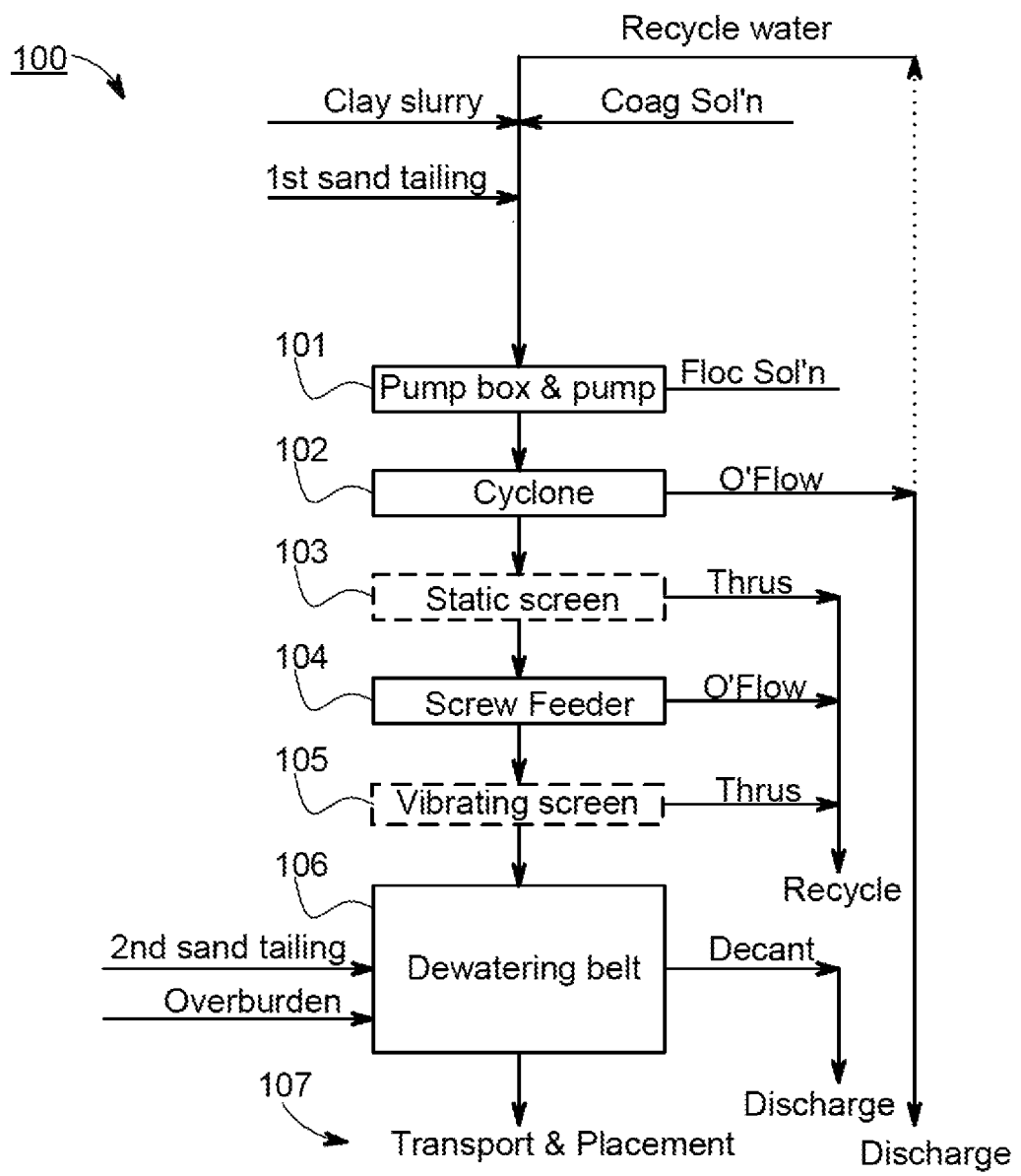
FIG. 1 is a block flow diagram illustrating exemplary process steps and components that may be implemented in accordance with aspects of the present disclosure.

The many features and advantages of the invention are apparent from the detailed specification, and thus, it is intended by the appended claims to cover all such features and advantages of the teachings of the disclosure which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention. Accordingly, it is noted that while the process and system for the dewatering of fine wastes is described with particular reference to the fine phosphatic clays generated by phosphate mining, one skilled in the art will appreciate from the teachings of the disclosure that claimed aspects can also apply to tailings from the kaolin industry, red mud from processing bauxite, and other chemical processing wastes.

By way of example, as it relates to phosphate mining, more than 95% of the phosphate rock mined in the United States is used to manufacture phosphatic fertilizers. There is no substitute for phosphorous in agriculture. Therefore, phosphate mining is essential to sustain agricultural productivity and bountiful crop yields. Generally, phosphate rock is currently mined in four states: Idaho, Utah, North Carolina, and Florida. In Florida, for example, the phosphate ores are marine sediments covered by other sediments, which may be referred to herein as overburden. The phosphate ores primarily contain clay minerals, silica sand, and grains of phosphate mineral. In the past, the first mines focused on rich deposits that had a high yield of phosphate rock and relatively low yields of clay and sand waste. As the rich deposits were exhausted it became essential to exploit lower grade ores. Froth flotation adapted to phosphate recovery was a major technological development that allowed lower grade ores to be mined economically. However, the yield of phosphate rock from the lower grade ores was reduced and the yield of sand waste increased due to the tailings produced by flotation. Presently, about one quarter to one third of the ore weight can be recovered as phosphate rock, about one quarter to one third can be clay waste rejected by the washing plant, and about one third to one half can be sand tailings rejected by the flotation plant.

The commercially viable phosphate deposits in Florida can be relatively shallow and flat lying. These deposits are strip mined by electric walking draglines. The overburden can be stripped from the ore by a dragline and placed onto spoil piles in the adjacent mined out pit. After stripping, the unconsolidated ore can be excavated by the same dragline and dumped into a slurry pit constructed on the surface of adjacent unmined land. The ore may be disaggregated in the slurry pit by high-pressure water jets and then transported to the beneficiation plant by slurry pipeline. Generally, the beneficiation facility can consist of a washing plant and a flotation plant. The washing plant may receive the ore slurry, completes disaggregation of the ore, and sort the ore into pebble phosphate rock (+1 mm), flotation feed (1×0.1 mm) and clay waste (−0.1 mm) by size classification.

The flotation plant may receive the flotation feed and apply reagents that allow the feed to be separated into a phosphate rock concentrate and sand tailings waste. Pebble and concentrate may then be combined to make the phosphate rock product. The sand tailings may be pumped to mined areas where they are used in reclaiming mined land. The clay waste more often than not exists as dilute slurry (about 3% solids by weight) that clarifies very slowly by natural sedimentation. One problem is that the volume of water associated with dilute clay waste exceeds the available storage volume in the mine. Consequently, the clay wastes have to be stored in huge above ground impoundments (e.g., clay ponds). Clarified water decanted from the clay ponds is recycled to the beneficiation plant for use as process water. Consolidated clays can accumulate and gradually fill the clay ponds until eventually the impoundments fill with clay slurry having a solids content of 20% to 30%. The volume of clay plus water associated with the clay exceeds the available volume in the mine footprint and past efforts have been unable to increase both the rate at which the clays consolidate and to increase the ultimate solids content of the clays.

By this disclosure a new process and associated system is disclosed. The system can include a dewatering cyclone, a screw classifier, and a dewatering apparatus, and with the process can enable the rapid dewatering of the slurry containing dilute clay and sand. In some embodiments, the dewatering apparatus may be a dewatering belt which may optionally include idle bars to further enable the dewatering. In yet additional embodiments, the system may additionally include one or more of centrifuges, a static mixer, static and/or vibrating screen(s), drum screens, belt screens, plate filters, feeders, and other liquid-solid separating devices. Process aspects enable the dewatered mixture to be blended with overburden to form a paste referred to as engineered reclamation material (ERM) which can further consolidate to the extent necessary to fit the mine footprint.

In accordance with some aspects of the disclosure, the process can include combining dewatered sand tailing with dilute clay slurry and flocculant. In one embodiment, for example, the flocculated slurry can be dewatered in a series of unit operations comprising of a cyclone, a static screen, and a screw classifier followed by a dewatering apparatus (e.g. dewatering belt). Overburden can then be added to the dewatered mixture of sand and clay to form the ERM material which can be suitable for backfilling the mine within its footprint and significantly increase the rate of dewatering. Moreover, the sand clay slurry may be more rapidly dewatered in high capacity equipment and in a practical manner. When overburden is added to the sand clay mix, the ERM formed not only can include extractable nutrients such as calcium, phosphorous, potassium, and magnesium, but the ERM may also include physical properties suitable for effective handling, transporting, and emplacing in disturbed lands, such as mine cuts.

Process and Associated System

Figure 2:
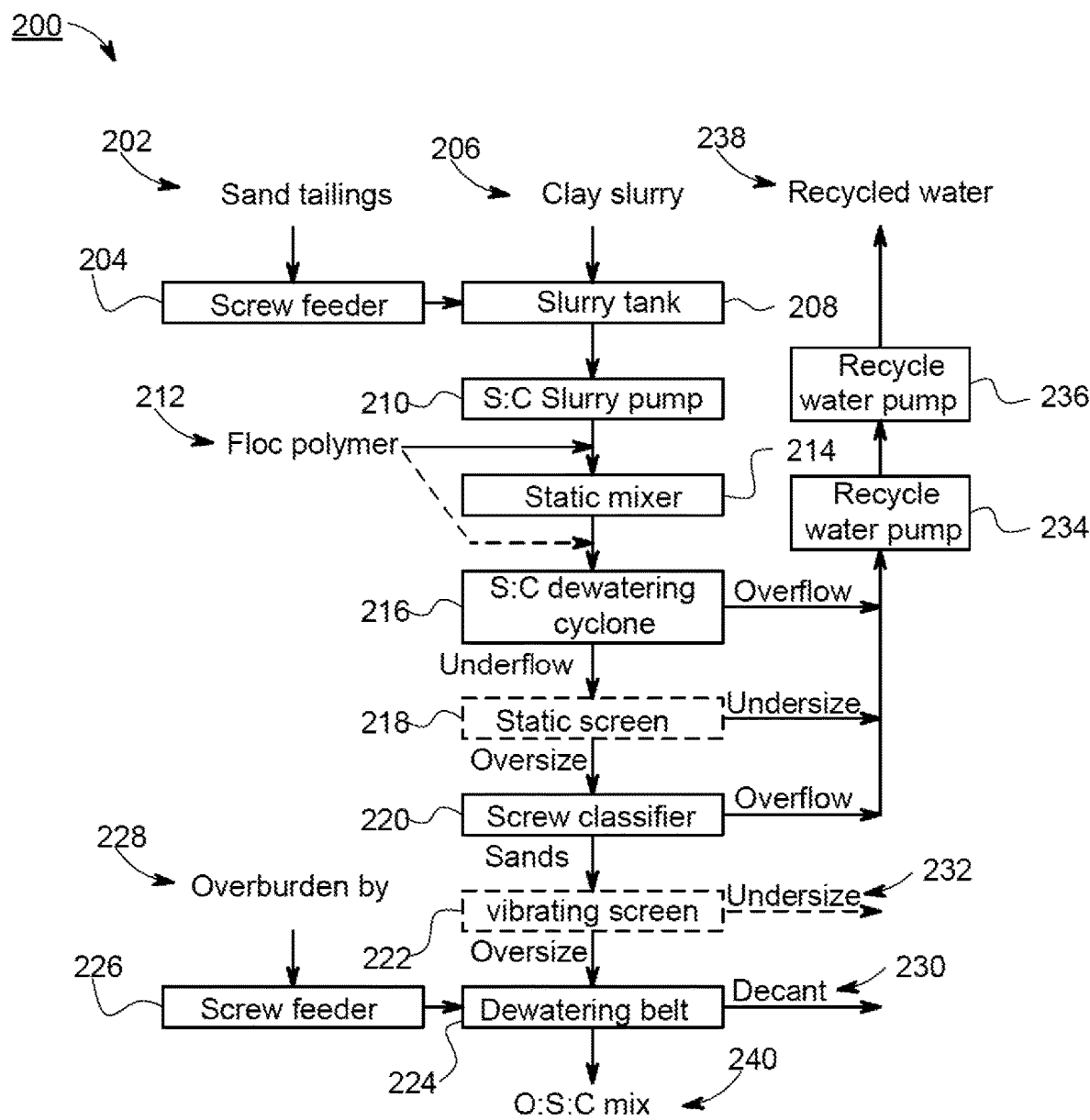
FIG. 2 is a block flow diagram illustrating additional exemplary process steps and components that may be implemented for the sand:clay mix dewatering process in accordance with aspects of the present disclosure.

Referring to FIGS. 1 and 2, block flow diagrams illustrating exemplary process steps and system components are shown. Beginning with FIG. 2, a block flow diagram 200 illustrating exemplary system components that may be implemented for the sand:clay mix dewatering process in accordance with aspects of the present disclosure is shown. According to an aspect of the disclosure, the process may begin with the forming of a sand:clay slurry containing sand tailings 202 and clay slurry 206. In some embodiments, clay slurry 206 may be transferred to a slurry tank 208 using a pump (not shown). Pump may be a constant or variable speed pump depending on the application. To form the sand clay slurry, sand tailings 202 can be metered into the slurry tank 208, for example, by using one or more screw feeder(s) 204. In some embodiments, feed rate of the one or more screw feeder(s) 204 may be controlled, e.g. by a variable frequency drive. The slurry tank 208 may also include a catching panel (not shown) to filter out oversized particles and/or trash from getting into the slurry tank 208.

From the slurry tank 208, in some embodiments, the sand clay slurry may be transferred using pump 210 to a static mixer 214 before reaching a dewatering cyclone 216. In accordance with aspects of the disclosure, after the sand clay slurry leaves the slurry tank 208 and before reaching dewatering cyclone 216, a flocculant polymer 212 can be added to the sand clay slurry as to flocculate the sand clay slurry. In some embodiments, the flocculant polymer 212 can include an organic or non-organic high molecular weight anionic, cationic, non-ionic, or any combination polymer thereof. For example, flocculant polymer 212 solutions may include an anionic emulsion type flocculent E533, cationic flocculant FL4620 and/or nonionic powder polymer 409G. Typically the type flocculant polymer 212 may be dictated by the type of clay, concentration, and/or its application method. For example, in some embodiments in which the static mixer 214 may be implemented, a high dosage of the anionic polymer 409G flocculant polymer 212 can be applied upstream of static mixer 214. In yet additional embodiments, coagulant (not shown) may also be added, for example, to high molecular weight anionic polymers, such as the anionic polymer 409G flocculant polymer 212.

Figure 4:
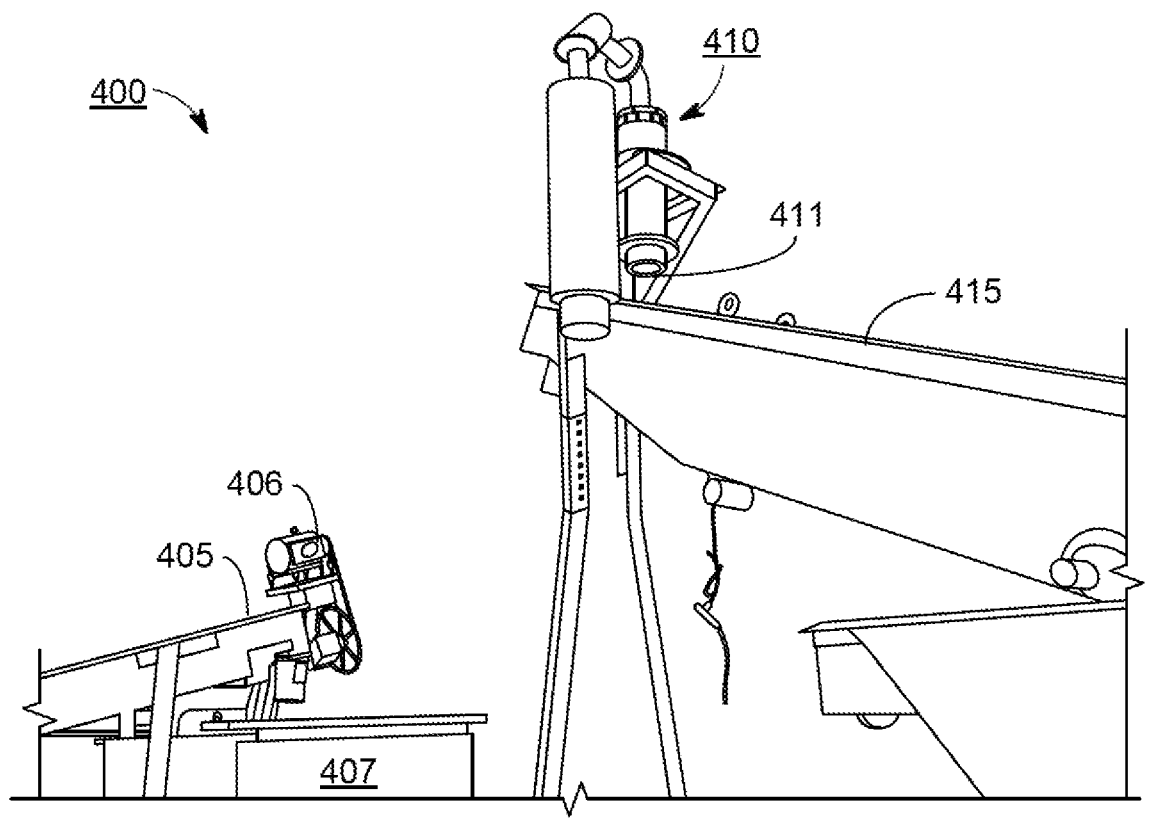
FIG. 4 is an illustration of an exemplary sand:clay preparation and initial dewatering system elements in accordance with at least some aspects of the present disclosure.

A dewatering cyclone 216 may be implemented as a high-capacity device for rapidly dewatering the flocculated sand clay slurry and separating it into underflow (product) and overflow (waste). In some embodiments, dewatering cyclone pressure control may be implemented and achieved, for example, by a pinch valve and/or variable frequency drive on the pump motor. An optional screen may be implemented after the dewatering cyclone 216, such as, for example, static screen 218. Static screen 218 may be included, for example, at an angle between 15 degrees and 70 degrees to enable the sand clay mix to move/roll on the surface of the static screen 218. Additionally, in some embodiments, the profile of the static screen may be, for example, between 1 mm and 0.75 mm as to allow oversize particles to pass to screw classifier 220. FIG. 4, for example, illustrates exemplary sand:clay slurry preparation and initial dewatering system elements 400 in accordance with at least some aspects of the present disclosure described. In particular, where the sand tailings 405 may be added to containment tank 406 containing clay slurry using a screw feeder 406 including a variable frequency drive which may be used to control the motor of the screw feeder. Dewatering cyclone 410 may be in relative proximity to the containment tank 406 such that flocculated sand clay slurry mix may pass through the dewatering cyclone 410. In some embodiments, the underflow 411 of the dewatering cyclone 410, from which flocculated sand clay slurry having been dewatered exits the dewatering cyclone 410, may be configured to lead onto optional further dewatering static screen 415, which may be positioned at an angle to allow movement/flow of the flocculated sand clay slurry mix to screw classifier (not shown in FIG. 4). In embodiments in which the static screen 218 is not included as part of the system, the sand clay mix may pass directly onto screw classifier 220.

Screw classifier 220 may be sized to be sufficiently large as to enable the sand clay mix to have more time to drain and to reduce the screw revolutions per minute (rpm), separating a greater amount of cleaner water. Overflow/undersize from the dewatering cyclone 216, static screen 218 (if included), and/or screw classifier 220, may be pumped, for example, using recycle pump(s) 243 and/or 236 to enable the system to recycle water 238. In some embodiments, the screw classifier 220 may be additionally fitted with a profile wire panel (not shown) to facilitate drainage from the sand clay mix being augured to the rake discharge of the screw classifier 220. In some embodiments, an optional vibrating screen 222 may be included to further separate undersize 232 particles and oversize sand clay mix passed onto a dewatering apparatus, such as, for example, dewatering belt 224.

Referring back to FIG. 2, according to some aspects, dewatering belt 224 may include idlers with beater bars to improve the dewatering of the sand clay mix. Overburden 228 may be fed using screw feeder 226, for example, to the dewatering belt 224 as to create engineered reclamation material (ERM) containing the overburden sand clay mix 240. Decant 230 may be further separated from the ERM while on the dewatering belt 224 or similar dewatering apparatus. According to some aspects, the sand to clay ratio of the ERM may range from 0.5:1 to 2.5:1 and the (sand+clay) to overburden ration may range from 0.5:1 to 5.0:1.

Figure 5:
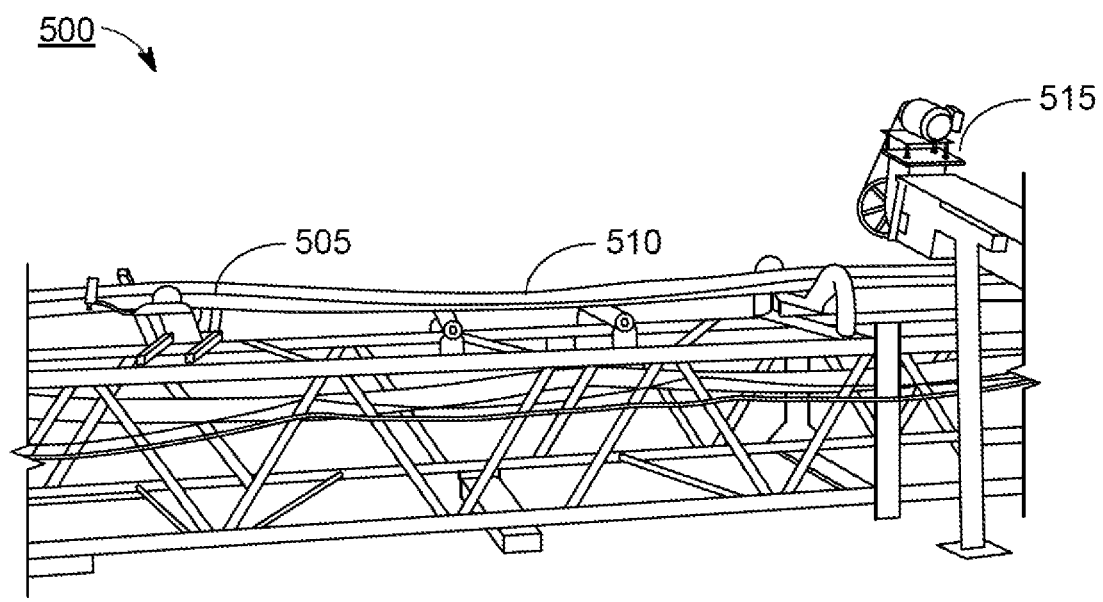
FIG. 5 is an illustration of an exemplary overburden screw feeder and dewatering belt system elements in accordance with at least some aspects of the present disclosure.

FIG. 5, for example, is an illustration of an exemplary overburden screw feeder and dewatering belt system elements 500 in accordance with at least some aspects of the present disclosure. In particular, the overburden screw feeder 515 being configured to add overburden (not shown) on at least one point along the length of the dewatering belt 510. In some embodiments, screw feeder 515 may include a variable frequency drive used to control the rate and addition of the overburden. In accordance with some aspects, in additional embodiments the flat center idler of the troughed idlers may include beater bars 505 which may be enabled to help the sand clay mix shed water during the dewatering process.

Referring back to FIG. 1, block flow diagram 100 illustrates additional/alternative exemplary process steps and components that may be implemented in accordance with aspects of the present disclosure. In particular, the flow diagram 100 providing exemplary method steps that may be implemented to achieve a sand-clay-overburden with about 60-70% solids, and more specifically 60-65% solids, while taking into account the cost restrictions and environmental needs. Beginning at step 101, old consolidated clays can be retrieved and re-slurried to about 3-4% solids using a coagulant solution. In some embodiments, this may take place in an agitated tank. This dilute clay stream may be the feed material to the pump box and pump. Sand along with a coagulant solution may be added to the pump box (e.g., 1:1 sand:clay by weight). A flocculant solution may then be added to the sand-clay slurry mix.

At step 102, a cyclone can be fed with the sand-clay slurry plus the flocculation solution. The cyclone overflow may be returned to the clay slurrying step 101. The underflow may be the initially dewatered slurry (e.g., resulting in about 15-20% solids). At step 103, an optional static screen may be implemented to continue the dewatering with the overflow being a weak paste, while the underflow may return to the clay slurrying step 101. After this step, the underflow may result, e.g., in about 20-25% solids. At step 104, a weak paste from the static optional screen may pass to a slow-turning screw classifier which can strengthen the paste, while also having the option of returning more water to the clay slurrying step 101. (The paste may have about 40% solids.) At step 105, the strengthened sand-clay paste may then pass onto a low-amplitude vibrating screen which can do additional dewatering. The vibrating screen which may cause the sand clay mix to result in about 45% solids.

At step 106, the paste can pass onto a long conveyor belt (e.g., 174' ft.) which can be uniquely equipped with "beater idlers." Beater idlers may be conventional roller idlers with longitudinally welded bar stock, for example. The function of the beater idlers can be, at least in part, to cause vibration and to open up channels for water to escape. The belt may be flattened at two or three points along its length, for example, to allow water to drain off of the belt. In addition to the beater idlers, sand and overburden can be added to the sand-clay mix at a plurality of points. In some embodiments, stationary plows can be used to mix the sand-clay-overburden as it travels along the belt. In some embodiments, the mixing of the overburden with the sand-clay mix may result, for example, in about 60-65% solids. The resulting S—C—O paste can be ERM and accordingly may be placed in a deep trench which, in some embodiments, may have two sleeved slotted corrugated 4" plastic underdrain pipes which may be overlain with coarse sand/gravel to create a filter bed. The underdrain pipes can connect to a vertical pipe from which water may be monitored and withdrawn. A cap of overburden can surcharge the ERM S—C—O mix.

Figure 3:
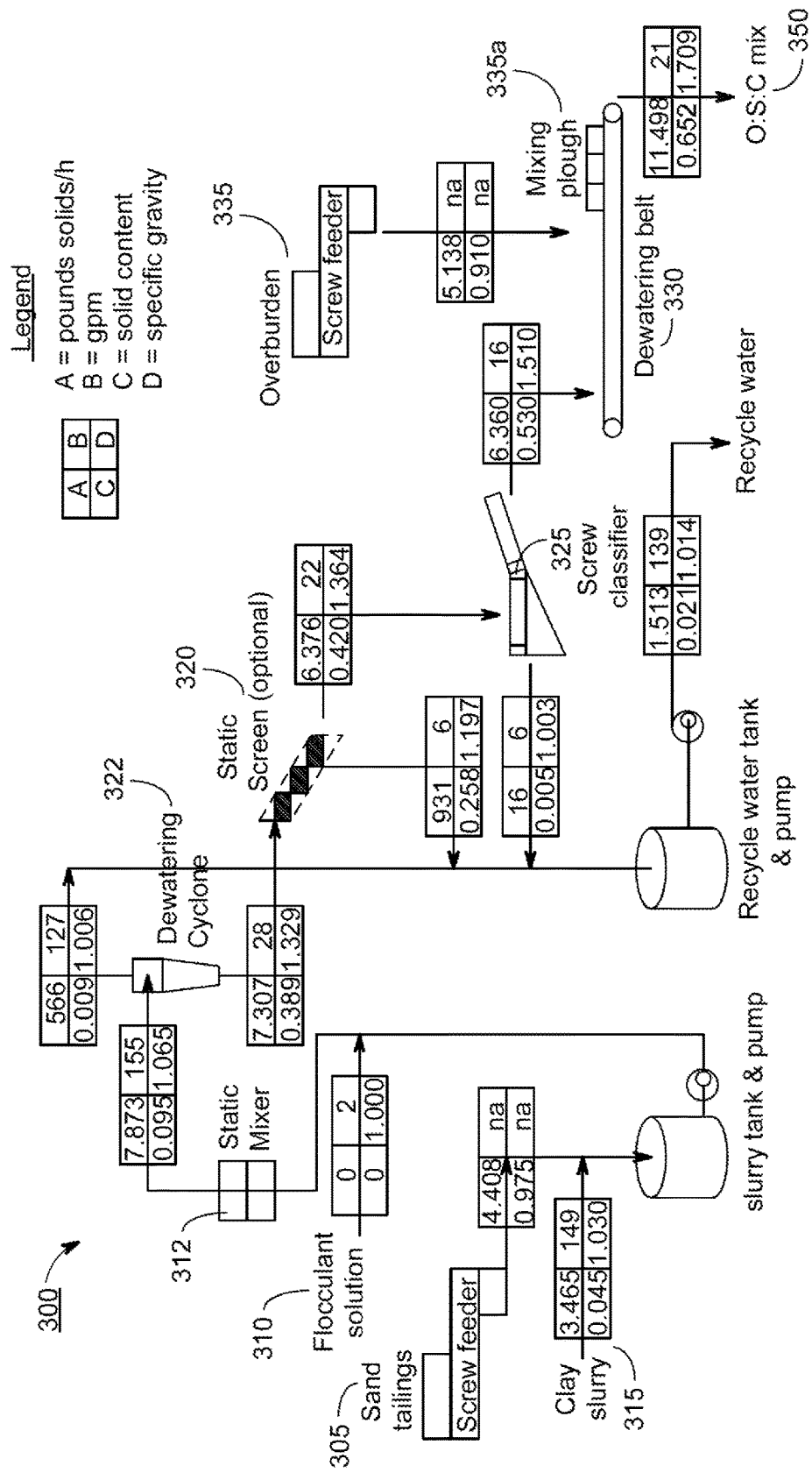
FIG. 3 is yet another exemplary process flow diagram illustrating an exemplary material balance in accordance with at least some aspects of the present disclosure.

Referring now to FIG. 3, yet another exemplary process flow diagram 300 illustrating an exemplary material balancing diagram in accordance with at least some aspects of the present disclosure is shown. In particular, utilization of exemplary collected solids content (Cw) data and water content (1−Cw) data of the feed, product, and waste streams for each unit operation may be used to determine the recoveries of solids and water for each corresponding unit operation. According to some aspects, testing data may include, for example, feed rates of clay slurry 315, sand tailing 305, and overburden 335, considering the solids content of all samples.

Material Balancing

According to at least some aspects of the disclosure, the material balances may be based on the feed rates of clay slurry 315, sand tailings 305, and overburden 335. The recoveries of solids and water for each unit operation may be based on the solids content (Cw) and water content (1−Cw) of the feed, product, and waste streams for that unit operation, according to the following two-product formula.

Recovery of solids=$C_{wp}/C_{wf} \times (C_{wf}-C_{ww})/(C_{wp}-C_{ww})$

Recovery of water=$(1-C_{wp})/(1-C_{wf}) \times ((1-C_{wf})-(1-C_{ww}))/((1-C_{wp})=(1-C_{ww}))=(1-C_{wp})/(1-C_{wf})-(C_{ww}-C_{wf})/(C_{ww}-C_{wp})$ Where: $C_{wp}$=solids content of product stream
$C_{wf}$=solids content of feed stream
$C_{ww}$=solids content of waste stream
Cw is expressed as a decimal fraction (dry weight/total weight)

Exemplary Material Testing

An example of recovery calculations for the dewatering cyclone 322 follows:
Feed stream solids content (Cwf)=0.084
Product stream solids content (Cwp)=0.320
Waste stream solids content (Cww)=0.006

Recovery of solids=0.320/0.084×(0.084−0.006)/(0.320−0.006)=0.946

Recovery of water=(1−0.320)/(1−0.084)×(0.006−0.084)/(0.006−0.320)=0.184

The exemplary dewatering cyclone 322 thus can have a feed rate which includes, for example, 3,000 pounds/hr dry clay, 4,200 pounds/hr dry tailings sand, and 78,514 pounds/hr of water. The exemplary calculated material balance for the dewatering cyclone 322 presented in the following tabulation.

| Stream | Feed | Product | Waste |
|---|---|---|---|
| Pounds/hr solids | 7,200 | 7,200 × 0.946 = 6,811 | 7,200 − 6,811 = 389 |
| Pounds/hr water | 78,514 | 78,514 × 0.184 = 14,447 | 78,514 − 14,447 = 64,067 |
| Pounds/hr total | 85,714 | 6,811 + 14,447 = 21,258 | 85,714 − 21,258 = 64,456 |
| Solids content (Cw) | 0.084 | 6,811/21,258 = 0.320 | 389/64,456 = 0.006 |

As presented below, similar calculations may be performed for other unit components, e.g., the static screen 320, screw classifier 325, and the screw feeder 305, to obtain the material balances for the tests.

Exemplary clay slurry 315 samples' solids content and specific gravity characteristics of exemplary clay solids are shown below in Table 1.

TABLE 1

| | Sample | | | | |
|---|---|---|---|---|---|
| | Clay 1 | Clay 2 | Clay 3 | Clay 4 | Average |
| % Solids | 53.2 | 62.2 | 47.4 | 62.7 | 56.4 |
| Specific Gravity | 2.75 | 2.80 | 2.82 | 2.76 | 2.78 |

Exemplary sand tailing 305 samples' solids content and specific gravity characteristics of exemplary sand tailing are shown below in Table 2.

TABLE 2

| | Sample | | | | |
|---|---|---|---|---|---|
| | Tailings 1 | Tailings 2 | Tailings 3 | Tailings 4 | Average |
| % Solids | 94.7 | 94.6 | 94.2 | 95.0 | 94.6 |
| % +105 µm | 98.8 | 98.8 | 99.4 | 98.4 | 98.8 |
| Specific Gravity | 2.72 | 2.72 | 2.76 | 2.69 | 2.72 |

Exemplary black topsoil samples' characteristics are shown below in Table 3. In some embodiments, for example, a prepared mixture, consisting of two parts sand tailings and one part black topsoil may be used to simulate overburden 335.

TABLE 3

| Size Distribution of Black Topsoil | | |
|---|---|---|
| US Sieve No. | Fraction (µm) | % Weight |
| 18 | +1,000 | 1.3 |
| 40 | 1,000/420 | 12.6 |
| 60 | 420/250 | 40.5 |
| 100 | 250/149 | 23.7 |
| 140 | 149/105 | 12.4 |
| 200 | 105/74 | 5.3 |
| Pan | −74 | 4.2 |

Material balances may be calculated using sample data collected from one or more tests. In the present example test, four test runs in month 6 (June) and three test runs in month 10 (October) were performed. Averaged recoveries of solids and water from each unit operation may be used for the different calculations. For example, for the June and October tests, the results may be compared as shown in Table 4 below. In accordance with aspects of the disclosure, unit operations may include the dewatering cyclone 322, static screen 320, screw classifier 325, and dewatering belt 330.

TABLE 4

| | Averaged Recoveries by Unit Operation | | | |
|---|---|---|---|---|
| | Solids Recovery | | Water Recovery | |
| Unit Operation | June Tests | October Tests | June Tests | October Tests |
| Cyclone | 88% | 91% | 21% | 15% |
| Screen | 90% | 88% | 66% | 76% |
| Classifier | 99% | 98% | 63% | 60% |
| Belt | 100% | 100% | 99% | 100% |
| Cumulative | 79% | 79% | 9% | 7% |

In some embodiments, as reflected in recovery table above, with regard to solids recovery to the product, small changes between the June and October test may result for individual unit operations, but generally the cumulative recovery of solids may remain essentially constant at 79%. Equipment and/or flocculant 310 changes or adjustments may enable the reduction of the quantity of water recovered in the product, for example, from 9% to 7%.

Rate samples may be measured for the total mass flow of selected streams over a recorded time period to determine the flow rate in pounds per hour. For example, in some embodiments rate samples may be routinely taken of the following streams:

Sand, tailing screw feeder discharge
Screw classifier sand discharge
Overburden screw feeder discharge An example of a rate sample for the sand tailings follows:
Sand tailings net mass=17.0 pounds
Sample time=11.4 seconds
Rate=17.0 pounds/11.4 seconds=1.49 pounds/sec.=5,368 pounds/hr In accordance with yet additional aspects of the disclosure, flow meter(s) may be installed to monitor the rate of clay slurry 315 from a fixed speed pump. Additionally or alternatively, in some embodiments, the clay slurry transfer rate may be back calculated from a known capacity of the dewatering cyclone 322 and the measured rates of sand tailings 305 and flocculant solution 310.

Figure 6:
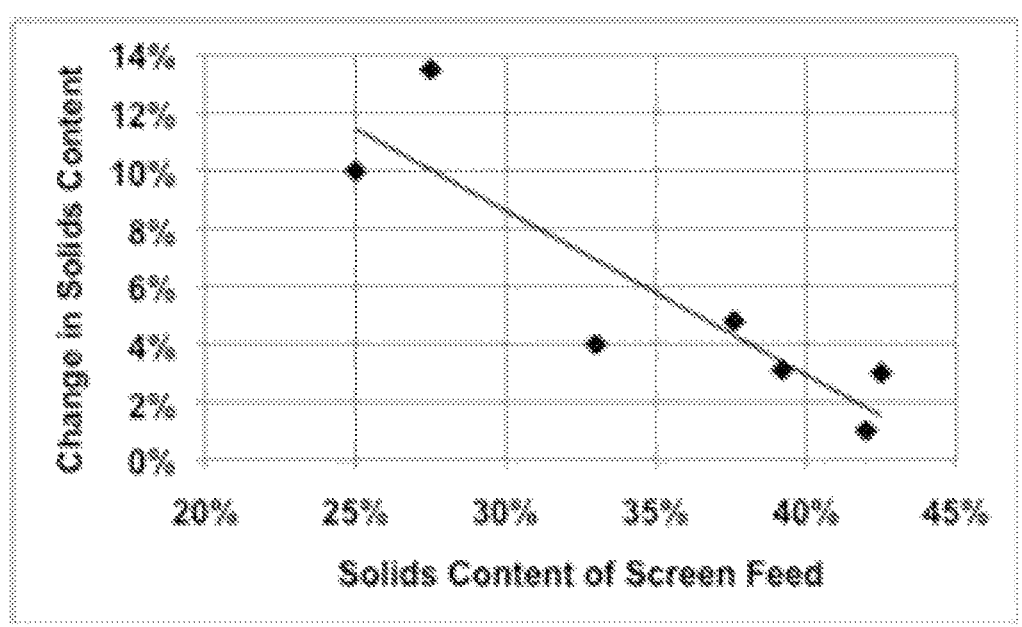
FIG. 6 is a graph showing an exemplary change in screen product percentage solids vs. screen feed percentage solids relationship according to aspects of the disclosure.

Cut samples of various streams may be taken to determine their solids content. For the following streams, for example, representative cut samples may be weighed, then dried and weighed again to measure the % solids:

Sand tailing 305 screw feeder discharge
Screw classifier 325 sand discharge
Overburden 335 screw feeder discharge
Dewatering belt 330 discharge Example data from solid material type of cut sample follows:
- Sand tailings net weight "as is"=295.0 grams
- Sand tailings net dry weight=288.0 grams
- Sand tailings % solids=100×288/295=97.6%
- Rate of dry sand tailings=5,368 pounds/hour×97.6/100=5,329 pounds/hour For the following slurry streams 315 the volume and net weight of the sample was measured.
- Clay slurry
- Sand:clay cyclone feed
- Sand:clay cyclone overflow
- Sand:clay cyclone underflow
- Static screen undersize
- Static screen oversize
- Screw classifier overflow
- Screw classifier sand discharge According to some aspects, the solids content of the streams may be calculated from the weight and volume of a slurry sample and the previously measured specific gravity of the solids. For example, slurry volume may be measured in a 1000 mL graduate cylinder and the screw classifier sand discharge can be treated either as a solids sample or as a slurry sample, depending on the consistency of the sample. In some embodiments, air bubbles may have to be removed in order to get a correct measure of clay slurry volume. In additional embodiments, it may be advantageous to additionally/alternatively dry the sample to get a correct clay slurry measurement. Example data from a clay slurry cut sample follows:
- Clay slurry sample net weight=990 grams
- Clay slurry sample volume=965 mL
- Clay slurry specific gravity=990 grams/965 mL=1.026
- Clay slurry factor=(1.026−1)/1.026=0.0253
- Clay solids factor=(2.78/(2.78−1)=1.562 (solids factor is derived from the specific gravity of the clay solids which averaged 2.78)
- Slurry % solids=100×slurry factor×solids factor 100× 0.0253×1.5562=4.0%
- Clay slurry transfer rate=150 gpm×60 min/hr×8.34 pounds/min×1.026=77,012 pounds/hr
- Clay solids transfer rate=77,012 pounds/hr×4.0/100=3,080 pounds/hr In accordance to some aspects of the disclosure, changes to one or more of the dewatering devices of the system 300 may enable solid content changes. For example, by adding/changing pressure control, from a manual pinch valve to a variable frequency drive on the pump motor, the performance of the dewatering cyclone may become more uniform, for example, increasing the solids content from about 32% to about 39%. Another modification may also include increasing screen 320 slope, area, and/or reducing wire opening, for example, from 1 mm to 0.75 mm. In alternative embodiments, the screen 320 may also be eliminated, depending on the properties of the solution mix. Yet another modification may include a change in the screw classifier 325. In some embodiments, for example, the screw classifier 325 may need to be sized with a sufficiently large diameter and/or longer in length so that the sand:clay mix removal can provide an acceptable overflow clarity. A larger and/or longer in length screw classifier 325 may provide the sand:clay mix more time to drain and the screw revolutions per minute (rpm) could be reduced, resulting in more quiescent classifier pool discharged cleaner water. Additional and/or alternatives to the screw classifier 325 may include, for example, fitting it with a profile wire panel to facilitate drainage from the sand:clay mix being augered to the rake discharge of the classifier. FIG. 6 shows an exemplary change in screen product percentage solid vs. screen feed percentage solids relationship and table 5 below shows how the components of the classifier waste streams may change over three days operation.

TABLE 5

| Classifier Waste Streams | | | | | | |
|---|---|---|---|---|---|---|
| | Oct. 17 | | Oct. 18 | | Oct. 21 | |
| | Flow % | Cw | Flow % | Cw | Flow % | Cw |
| O'flow 1 | 78.9 | 0.048 | 96.5 | 0.018 | 100.0 | 0.005 |
| O'flow 2 | 21.1 | 0.138 | 3.5 | 0.123 | 0 | 0 |
| Combined | 100.0 | 0.067 | 100.0 | 0.022 | 100.0 | 0.005 |

Cw is the solids concentration expressed as a decimal fraction (multiply by 100 to get percent)
O'flow 1 is the overflow from the classifier pool
O'flow 2 is drainage from the screen panel As shown in the exemplary table results, drainage from the screen panel (overflow 2) can decrease from 21.1% of the waste flow on the first day to 3.5% of the waste flow on the second day to 0% flow on the third day because of a flocculated material blinding the screen panel. Additionally, with the screw operating at higher rpm the classifier pool overflow (O'flow 2) can contain 4.8% solids and 1.8% solids. With a lower RPM, such as, 6 rpm, the resultant overflow may contain only 0.5% solids.

In some embodiments, dewatering belt 350 may include one or more flat center troughed idler or mixing plough 330a with beater bars, which may be used to help the sand:clay slurry mix shed water. The dewatering best may run at belt speeds, for example, of no more than 200 feet per minute for the beater bars to remain effective and not inhibit liquid solid separation. The belt speed and other modifications may be adjusted according to the application. For example, the cross section profile of the belt may be modified to enable the free water to overflow to the edges of the belt and improve free water removal. In accordance with aspects of the disclosure, overburden 335 can be added to the sand:clay slurry mix on the dewatering belt to produce the overburden:sand:clay mix 350 ERM.

With respect to the flocculant solution 310, in some embodiments, high dosages of the flocculant solution 310 may be added before reaching the static mixer 312 for the resulting flocculated material to become entrained the sand tailings and result in a flocculated material that can be more homogeneous than if added after the static mixer 312. Exemplary tables 6 below shows how the addition point of the flocculant can change the solids recovery.

TABLE 6

| Flocculant Addition Point | | | | |
|---|---|---|---|---|
| Addition Point | S:C Ratio | Floc Lb/t Clay | S:C Mix Cw | Recovery |
| After mixer | 1.90 | 1.03 | 0.567 | 77.9% |
| Before mixer | 1.27 | 1.03 | 0.534 | 80.8% |
| Difference | 0.63 | 0.00 | 0.033 | −2.9% |

Recovery is the percentage of cyclone feed solids remaining in the classifier product.

In addition, exemplary averaged inputs and outputs of solids for tests performed are compared in Table 7 below.

TABLE 7

Average Solids Balances for June and October Tests

| | June Test Average | | October Test Average | |
|---|---|---|---|---|
| Material | Lbs solids/hr | % Weight | Lbs solids/hr | % Weight |
| Clay solids | 4,290 | 26.6% | 2,932 | 23.3% |
| Sand Tailings solids | 3,852 | 23.8% | 4,838 | 38.4% |
| Overburden solids | 8,011 | 49.6% | 4,834 | 38.4% |
| Total Input solids | 16,154 | 100.0% | 12,604 | 100.0% |
| Cyclone Waste solids | 978 | 6.1% | 722 | 5.7% |
| Screen Waste solids | 701 | 4.3% | 822 | 6.5% |
| Classifier Waste solids | 55 | 0.3% | 103 | 0.8% |
| Belt Waste solids | 0 | 0% | 0 | 0% |
| Subtotal Waste solids | 1,735 | 10.7% | 1,647 | 13.1% |
| O:S:C Mix solids | 14,419 | 89.3% | 10,957 | 86.9% |
| Total Output solids | 16,154 | 100.0% | 12,604 | 100.0% |

In accordance with sample tests according to aspects of the disclosure, the sand:clay slurry ratio of the input solids may average from about 0.90 to about 1.65. The overburden and sand to clay ratio of the input solids may average from about 2.77 to about 3.30. When the sand to clay slurry ratio of the waste streams may remain the same, the output overburden:sand:clay slurry ratio may average from about 3.20 to about 3.97.

Four of the output streams in Table 7 can be designated as waste because they may be associated with water removed from the clay slurry and, in a commercial plant, these so-called waste solids could be recovered by sedimentation, recycled, flocculated, and added to the sand:clay mix. On average, about 6% of the solids may be rejected by the cyclone. On average, the solids rejected by the screen may be from about 4% to about 7%. The solids rejected by the classifier may be from about 0.3% to about 0.8%, and generally being less than 1%.

In some embodiments, the sand:clay mix may be dewatered to an average solids content from about 50% to about 55%, with a low from about 45% to about 53% solids and a high from about 54% to about 56% solids, for example. Additionally, the average solids content of the overburden:sand:clay slurry mix may range from about 64% to about 71, with the percentages of overburden solids in the overburden:sand:clay slurry mix solids ranging from about 44% to 55%. By normalizing the overburden addition to about 50% weight and about 95% solids content, the solids content of the overburden:sand:clay slurry mix may be from about 65% to about 70%. Exemplary average water inputs and outputs of water for tests are compared in Table 8.

TABLE 8

Averaged Water Balances for June and October Tests

| | June Test Average | | October Test Average | |
|---|---|---|---|---|
| Material | $H_2O$ solids/hr | % Weight | $H_2O$ solids/hr | % Weight |
| Clay water | 71,648 | 95.5% | 73,557 | 98.0% |
| Sand Tailings water | 203 | 0.3% | 121 | 0.1% |
| Floc Solution water | 2,752 | 3.6% | 1,051 | 1.4% |
| Overburden water | 415 | 0.6% | 351 | 0.5% |
| Total Input water | 75,017 | 100.0% | 75,079 | 100.0 |
| Cyclone Waste water | 58,703 | 78.3% | 63,901 | 85.1% |
| Screen Waste water | 5,402 | 7.2% | 2,592 | 3.4% |
| Classifier Waste water | 3,837 | 5.1% | 3,276 | 4.4% |
| Belt Waste water | 40 | 0.1% | 0 | 0% |
| Subtotal Waste water | 67,982 | 90.6% | 69,769 | 92.9% |
| O:S:C Mix water | 7,035 | 9.4% | 5,310 | 7.1% |
| Total Output water | 75,017 | 100.0% | 75,079 | 100.0% |

The percentages or water rejectead by one or both the screen and the classifier may decrease due to there being less water content in the feeds. In addition, the solids in the recycled water from a commercial plant may be collected and returned to the slurry tank for flocculation and dewatering with the sand:clay slurry mix. For example, the hourly rate of solids fed to the pilot plant may include 4,408 pounds sand tailings and 3,465 pounds clay, for a total of 7,873 pounds per hour. The solids lost during dewatering may total around 1,513 pounds per hour, equivalent to 19% of the feed solids. The solids pounds per hour rejected by the cyclone, screen, and classifier may be 566,931, and 16, respectively. The screen may remove 6 gpm slurry containing about 25.8% solids from the sand:clay slurry mix.

Overburden mixed with sand:clay slurry mix may be discharged from the dewatering belt as paste and promptly transferred to storage containers, for example, by a front end loader. Table 9 below show exemplary test results for samples taken from plywood boxes containers.

TABLE 9

Test Results for Auger Samples Taken from Plywood Boxes

| | Date | | | Sample Interval | | | | % Weight by Size Fraction | | | | | |
|---|---|---|---|---|---|---|---|---|---|---|---|---|---|
| | (mm/dd/yy) | | Duration | (inches) | | Solids | Water:Clay | 425/ | 212/ | 106/ | | | Sand:Clay |
| Box | Filled | Sampled | (days) | Bottom[1] | Top | Content[2] | Ratio[3] | +425 um | 300 um | 106 um | 74 um | −74 um | Ratio[4] |
| 1 | Jun. 14, 2016 | Jul. 5, 2016 | 21 | 32.1 | 41.0 | 67.5% | 1.32 | 15.0% | 33.7% | 13.4% | 1.4% | 36.5% | 1.74 |
| | | | | 22.1 | 32.1 | 66.3% | 1.39 | 12.9% | 34.0% | 15.1% | 1.5% | 36.6% | 1.73 |
| | | | | 7.9 | 22.1 | 66.9% | 1.51 | 14.4% | 37.5% | 14.0% | 1.3% | 32.8% | 2.05 |
| | | | | 0.0 | 7.9 | 67.1% | 1.46 | 13.8% | 35.8% | 15.4% | 1.4% | 33.6% | 1.97 |
| | | | | arithmetic average | | 66.9% | 1.42 | 14.0% | 35.2% | 14.5% | 1.4% | 34.9% | 1.87 |

TABLE 9-continued

Test Results for Auger Samples Taken from Plywood Boxes

| Box | Date (mm/dd/yy) Filled | Date (mm/dd/yy) Sampled | Duration (days) | Sample Interval (inches) Bottom[1] | Sample Interval (inches) Top | Solids Content[2] | Water:Clay Ratio[3] | % Weight by Size Fraction +425 um | % Weight by Size Fraction 425/ 300 um | % Weight by Size Fraction 212/ 106 um | % Weight by Size Fraction 106/ 74 um | % Weight by Size Fraction −74 um | Sand:Clay Ratio[4] |
|---|---|---|---|---|---|---|---|---|---|---|---|---|---|
| 2 | Jun. 21, 2016 | Jul. 5, 2016 | 14 | 58.1 | 66.5 | 84.4% | 1.27 | 21.2% | 36.7% | 23.1% | 4.5% | 14.6% | 5.86 |
|   |   |   |   | 50.2 | 58.1 | 82.5% | 1.30 | 18.3% | 37.8% | 23.5% | 4.1% | 16.3% | 5.14 |
|   |   |   |   | 41.3 | 50.2 | 81.7% | 1.31 | 19.2% | 38.0% | 21.9% | 3.9% | 17.0% | 4.87 |
|   |   |   |   | 31.8 | 41.3 | 80.3% | 1.45 | 19.0% | 36.7% | 23.2% | 4.3% | 16.9% | 4.90 |
|   | Jun. 17, 2016 | Jul. 5, 2016 | 18 | 18.8 | 31.8 | 75.2% | 1.59 | 17.8% | 37.7% | 20.3% | 3.5% | 20.8% | 3.80 |
|   |   |   |   | 9.3 | 18.8 | 74.5% | 1.50 | 16.1% | 38.6% | 19.6% | 2.9% | 22.8% | 3.39 |
|   |   |   |   | 0.0 | 9.3 | 75.1% | 1.45 | 16.4% | 40.8% | 17.7% | 2.1% | 22.9% | 3.36 |
|   |   |   |   | arithmetic average |  | 79.1% | 1.41 | 18.3% | 38.0% | 21.3% | 3.6% | 18.8% | 4.33 |
| 3 | Jun. 21, 2016 | Jul. 5, 2016 | 14 | 32.2 | 42.3 | 80.2% | 1.16 | 19.2% | 36.1% | 20.0% | 3.4% | 21.3% | 3.69 |
|   |   |   |   | 21.7 | 32.2 | 80.9% | 1.53 | 19.1% | 38.5% | 22.9% | 4.1% | 15.4% | 5.50 |
|   |   |   |   | 10.0 | 21.7 | 79.6% | 1.81 | 18.9% | 40.1% | 22.7% | 4.1% | 14.2% | 6.05 |
|   |   |   |   | 0.0 | 10.0 | 79.2% | 2.00 | 19.5% | 37.8% | 24.9% | 4.8% | 13.1% | 6.62 |
|   |   |   |   | arithmetic average |  | 80.0% | 1.56 | 19.2% | 38.1% | 22.6% | 4.1% | 16.0% | 5.25 |
| 4 | Jun. 24, 2016 | Jul. 5, 2016 | 11 | 58.1 | 64.4 | 80.6% | 1.37 | 16.1% | 45.5% | 19.0% | 1.9% | 17.6% | 4.70 |
|   |   |   |   | 52.1 | 58.1 | 86.9% | 1.44 | 17.1% | 51.7% | 19.1% | 1.6% | 10.4% | 8.59 |
|   |   |   |   | 45.7 | 52.1 | 82.7% | 1.88 | 18.8% | 49.6% | 18.8% | 1.7% | 11.1% | 8.00 |
|   |   |   |   | 38.4 | 45.7 | 79.8% | 2.01 | 17.3% | 49.8% | 18.6% | 1.8% | 12.6% | 6.96 |
|   |   |   |   | 27.3 | 38.4 | 78.7% | 2.58 | 18.4% | 51.1% | 18.3% | 1.7% | 10.5% | 8.52 |
|   |   |   |   | 18.8 | 27.3 | 78.6% | 2.51 | 17.9% | 51.8% | 17.7% | 1.7% | 10.8% | 8.22 |
|   |   |   |   | 9.7 | 18.8 | 78.8% | 2.74 | 18.6% | 50.4% | 19.4% | 1.8% | 9.8% | 9.21 |
|   |   |   |   | 0.0 | 9.7 | 78.8% | 2.84 | 19.4% | 50.2% | 18.8% | 2.1% | 9.5% | 9.52 |
|   |   |   |   | arithmetic average |  | 80.6% | 2.08 | 18.0% | 50.0% | 18.7% | 1.8% | 11.5% | 7.67 |
| 5 | Jun. 30, 2016 | Jul. 5, 2016 | 5 | 58.2 | 67 | 82.5% | 1.48 | 16.1% | 45.5% | 21.2% | 3.0% | 14.3% | 6.01 |
|   |   |   |   | 48.8 | 58.2 | 74.3% | 1.68 | 15.4% | 41.9% | 19.6% | 2.7% | 20.5% | 3.87 |
|   |   |   |   | 37.9 | 48.8 | 79.0% | 1.55 | 15.8% | 44.4% | 19.9% | 2.7% | 17.2% | 4.82 |
|   |   |   |   | 27.9 | 37.9 | 79.6% | 1.64 | 16.4% | 45.6% | 19.5% | 2.8% | 15.7% | 5.39 |
|   |   |   |   | 17.8 | 27.9 | 78.8% | 1.67 | 17.2% | 44.3% | 19.8% | 2.6% | 16.2% | 5.19 |
|   |   |   |   | 9.7 | 17.8 | 79.2% | 1.67 | 15.9% | 45.2% | 20.4% | 2.8% | 15.8% | 5.33 |
|   |   |   |   | 0.0 | 0-9.7 | 78.3% | 1.68 | 17.3% | 42.2% | 20.7% | 3.2% | 16.5% | 5.06 |
|   |   |   |   | arithmetic average |  | 78.8% | 1.62 | 16.3% | 44.2% | 20.1% | 2.8% | 16.6% | 5.03 |

[1] Intervals are measured from the bottom up. (0.0 represents the interface between the sand bed and the paste)
[2] Solids content is measured on a wet basis. % solids = 100 × solids dry weight/(sample dry weight + moisture weight)
[3] The Water:Clay Ratio = weight of moisture/weight of −74 um, which assumes that the −74 um material is clay.
[4] The Sand:Clay Ratio = 100 × weight of +74 um/weight of −74 um, which assumes that the −74 um is clay and the +74 um is sand.

By means of example, box 3 was partially filled with overburden:sand:clay slurry mix. The sand:clay slurry ration of this paste was high at 5.25, which added strength to the paste. The sample data from Box 3 indicated that after 14 days the paste had dewatered to 80% solids. The corresponding water to clay ratio was 1.56. No thickness measurements for Box 3 were taken until day 14. On day 111 the paste thickness was 96% of the thickness on day 14.

As an additional example, box 4 was filled with overburden:sand:clay slurry mix. The paste placed in Box 4 contained nominally 71% solids. After 11 days, the solids content averaged 81%. The paste solids averaged 11.5%—74 µm and there was no significant indication that the sand and clay had segregated in the box. The calculated sand:clay ratio was 7.67. The water to clay ratio had been reduced from 3.54 to 2.17 in 11 days. The measurements taken after one hour and 2,587 hours indicated paste thicknesses of 43.0 inches and 39.0 inches, respectively. By day 17 the overburden:sand:clay slurry mix thickness was 91% of the initial thickness and it did not change through day 108.

In yet another example, box 5 was filled with overburden:sand:clay mix. The paste placed in box 5 contained nominally 66% solids. The solids content of the paste was 79% after five days and 84% after 71 days. The paste solids averaged 16.6%—74 µm and there was no significant indication that the sand and clay had segregated in the box. The calculated sand:clay slurry ratio was 5.03. The water to clay ratio had been reduced from 3.10 to 1.60 in five days and 1.15 after 71 days. The measurements taken after three hours and 2,472 hours indicated paste thicknesses of 44.0 inches and 40.0 inches, respectively. By day 71, the overburden:sand:clay slurry mix thickness was 91% of the initial thickness and it did not change through day 103.

In yet another example, paste from the tests was placed on an above ground pile. A sample taken from the middle of the pile at the end of the day contained 74.8% solids. The solid particles in the paste were 16.4%—74 µm and 19.0%—105 µm. Vertical cracks in the pile were evident on day 4. By day 69 the surface of the pile appeared somewhat sandy and several plants had taken root on the pile's surface.

As a last example, paste produced at about 65% solids was placed in a small trench. The paste in the trench was sampled by hand auger. The overburden:sand:clay slurry mix thickness was about 34 inches. The solids content of the consolidated paste sample was 80% and the −74 µm material was 22.5% weight of the dry solids. The corresponding S:C and water to clay ratios were 3.44 and 0.86, respectively.

The above-mentioned containers were also sampled and the solids contents of the samples were measured. Boxes 1 through 5 were shielded from rainfall by a roof. The trench and the CONEX were not shielded from rainfall. All of the containers had been stored above the water table. The sample from Box 1, which contained a mixture of sand tailings and clay, had a solids content of about 86.1%. The other containers held mixtures of overburden, sand tailings, and clay. The solids contents of samples from Boxes 2, 3, and 5 were about 85.5%, 89.2%, and 85.8%, respectively. The sample from Box 4, which contained paste with a S:C Ratio of about 7.67, had a solids content of about 86.7%, but due to the relatively low clay content, the water to clay ratio of about 1.33 was higher than that of the other samples. The solids contents of the trench and CONEX samples were about 82.7% and 82.9%, respectively. The final sampling results are summarized in Table 10 below showing how paste samples from the five boxes, which had been stored for about six months had an average solids content of 86.7% while paste samples from the CONEX and trench, which had been stored for about two months had an average solids content of 82.8%.

TABLE 10

Final Sampling Results

| Container | % Solids | % Moisture | Water to Clay Ratio |
|---|---|---|---|
| Box 1 | 86.1 | 13.9 | 0.46 |
| Box 2 | 85.5 | 14.5 | 0.90 |
| Box 3 | 89.2 | 10.8 | 0.76 |
| Box 4 | 86.7 | 13.3 | 1.33 |
| Box 5 | 85.8 | 14.2 | 1.00 |
| CONEX | 82.7 | 17.3 | 1.10 |
| Trench | 82.9 | 17.1 | 0.91 |
| Average | 85.6 | 14.4 | 0.92 |

The solids content, expressed as a decimal fraction, and the water to clay ratios for the seven samples are plotted against the sand:clay slurry mix in FIG. 18 below. The data may show that the solids content of the dewatered paste can be independent of the sand to clay ratio. On the other hand, the water to clay ratio may tend to increase as the sand to clay ratio of the paste increases.

The Box 1 sample tested had a liquid to solid ratio of about 1.14, equivalent to a solids content of about 46.7%. Although the paste in Box 1 was initially more dilute than the paste in the other boxes, within six months the paste in Box 1 could reach about the same solids content without overburden as the other pastes achieved with overburden. The compression test implemented comprised six compression increments from 100 PSF to 4,000 PSF followed by two decompression increments ending at 100 PSF with a total lapsed time of 110 minutes.

Figure 7:
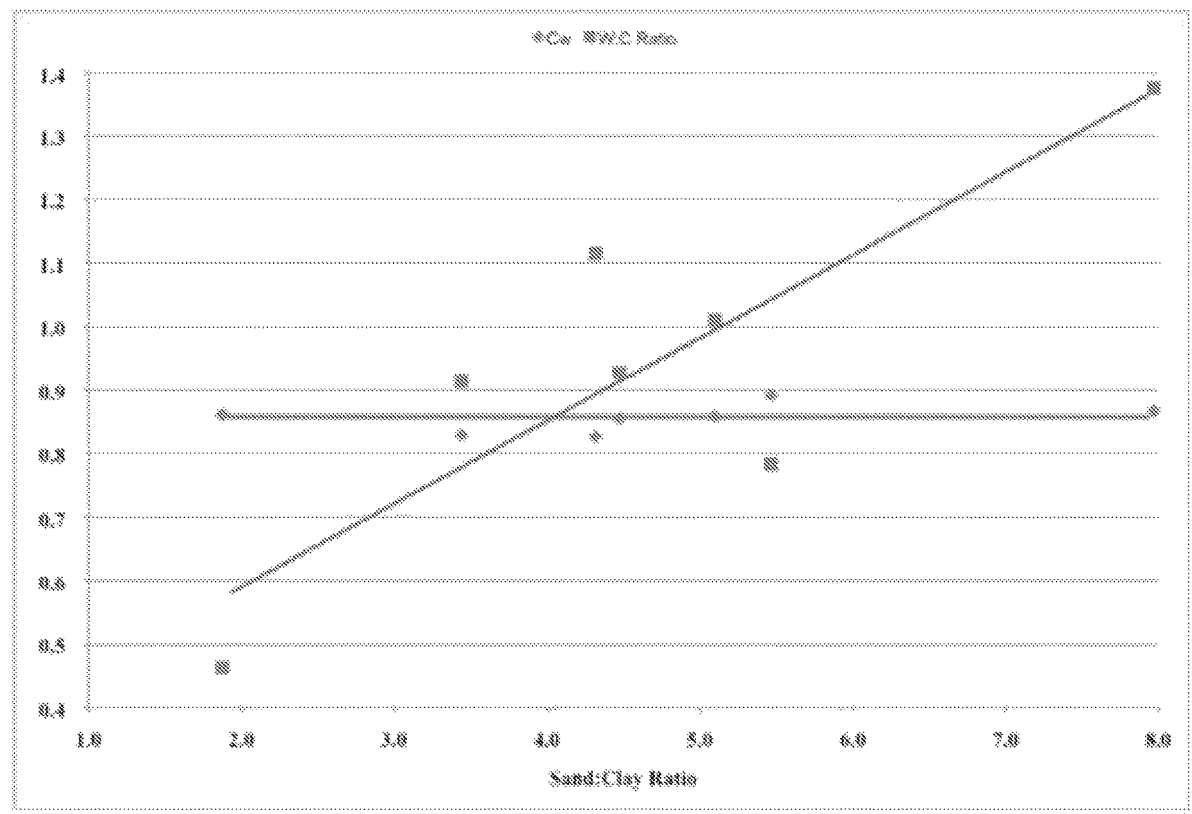
FIG. 7 is a graph showing an exemplary relationship between a final solids content and water to clay ratio vs. sand:clay ratio according to aspects of the disclosure.

From the compression tests it was shown that the rapid compression rate for paste from Box 1 implies rapid dewatering. Box 1 paste solids content increased from the mid-forties to about 67% solids in 21 days, and to about 86% solids within six months. FIG. 7 is a graph showing an exemplary relationship between a final solids content and water to clay ratio vs. sand:clay ratio according to aspects of the disclosure.

Standard Soil Tests

Standard soil test may also be performed on overburden:sand:clay slurry mix, for example, taken from Box 5. For example;
Water Content=19.42%
Atterberg Limits
Liquid limit=20
Plastic limit=20
Plasticity Index=0
Rigid Wall Permeability=5.98 inches/hr
Total Density—2.06×62.4=128.8 lbs/ft3
Dry Density—1.73×62.4=107.9 lbs/ft3
Porosity and Field Storage Capacity
Porosity=35.5%
Filiable Porosity=1.9%
Particles passing 74 μm=14.5%

It should be noted that the above water content is actually the liquid:solid ratio expressed as a percentage. The moisture content and the solids content may be derived from the liquid:solid ratio (0.1942) according to the following formula:

Moisture content=100×0.1942/(1+0.1942)=16.26%

Solids content=100×1/(1+0.1942)=83.74%

When measured, according to some aspects, the permeability of the paste may be considerably higher than expected for a mixture of phosphatic clay and tailings sand.

In addition, samples of dewatered paste, for example, from plywood boxes 1, 2, 3, 4, and 5 can undergo producer soil tests. In accordance with some aspects, the samples may be found to contain extractable phosphorous, potassium, magnesium, and calcium nutrients that would reduce or eliminate fertilizer requirements for planted crops. For example, the projected fertilizers requirements for selected crops grown on the paste are presented in Table 11 below.

TABLE 11

Fertilizer Requirements for Crops Planted on S:C Mix or O:S:C Mix

| | Corn | | Soybeans | Improved Perennial Grasses |
|---|---|---|---|---|
| | Non-irrigated | Irrigated | | |
| CaO - lbs/acre | 0 | 0 | 0 | 0 |
| N - lbs/acre | 150 | 210 | 0 | 160 |
| P2O5 - lbs/acre | 0 | 0 | 0 | 0 |
| K2O - lbs/acre | 120 | 175 | 60 | 80 |
| Mg - lbs/acre | 0 | 0 | 0 | 0 |

Accordingly, when overburden was added to the dewatered mixture of sand and clay, the solids content of the resultant paste ranged from about 65% to about 70%. When the paste was piled on the ground, water could be observed collecting at the toe of the pile. Paste containing 65% solids was placed in a shallow trench. A sample of the paste taken from the trench 12 days later had a solids content of 80%. The water to clay ratio of that sample met the target ratio of ≤1.22. The material balance indicated the paste was about 2.31 parts overburden, about 1.65 parts sand, and about 1 part clay. The solids content of paste sample had increased to 84% after 71 days. The corresponding water to clay ratio was 1.15, which met the target ratio of ≤1.22. The average permeability of the sample from Box 5 was 5.98 inches per hour and the plasticity index was 0, meaning the dewatered paste was non-plastic.

The tests also demonstrated that dilute sand:clay slurry could be rapidly dewatered in high capacity equipment. When overburden was added to the sand:clay slurry mix an ERM with physical properties suitable for effective handling, transporting, and emplacing in mine cuts was produced. Soil producer tests also indicated the mix in each box contained extractable nutrients such as calcium, phosphorous, potassium, and magnesium.

One skilled in the art will realize that additional complementary and/or equivalent steps can be added before, during, and after, the process steps described above. Similarly, while specific components of the system are described, the inventive aspects disclosed herein are not limited to those and include existing components which may be used, in addition to or alternatively, to accomplish the various aspects realized herein.

What is claimed is:

1. A process for generating an engineered reclamation material with high permeability and low plasticity that can be used to enable more rapid and improved land reclamation of disturbed lands, the process comprising:
controlling one or more feed rate of at least one dewatering device of a mining system to mix, a clay slurry, a flocculant, a sand tailing anti an overburden to generate the engineered reclamation material and a resulting waste;
determining the recovery of solids of the feed to the product by calculating Cwp/Cwf×(Cwf−Cww)/(Cwp−Cww); and
determining the recovery of water from the feed to the product by calculating (1−Cwp)/(1−Cwf)×((1−Cwf)−(1−Cww)/(Cwp−Cww), wherein Cwf is the solids concentration of the feed slurry, Cwp is the solids concentration of the product slurry, and Cww is the solids concentration of the waste slurry.

2. The process of claim 1, wherein the engineered reclamation material formed has a water to clay ratio that is less than about 1.22 with a clay solids content that is greater than about 45%.

3. The process of claim 2, wherein the engineered reclamation material formed is used in disturbed lands resulting from a mining operation.

4. The process of claim 3, wherein the engineered reclamation material formed has a sand to clay ratio ranging from 0.5:1 to 2.5:1 and the sand plus clay to overburden has a ration ranging from 0.5:1 to 5.0:1.

5. The process of claim 1, wherein the flocculant is an anionic polymer flocculant and additionally includes a coagulant.

6. A process for generating an engineered reclamation material with high permeability and low plasticity that can be used to enable more rapid and improved land reclamation of disturbed lands, the process comprising:
using controlled teed rates to mix, a clay slurry, a flocculant, a sand tailing and an overburden to generate the engineered reclamation material having a water to clay ratio that is less than about 1.22 with a clay solids content that is greater than about 45%, and a resulting waste;
determining the recovery of solids of the feed to the product by calculating Cwp/Cwf×(Cwf−Cww)/(Cwp−Cww); and
determining the recovery of water from the feed to the product by calculating (1−Cwp)/(1−Cwf)×((1−Cwf)−(1−Cww)/(Cwp−Cww), wherein Cwf is the solids concentration of the feed slurry, Cwp is the solids concentration of the product slurry, and Cww is the solids concentration of the waste slurry.

7. A process for generating an engineered reclamation material with high permeability and low plasticity that can be used to enable more rapid and improved land reclamation of disturbed lands, the process comprising:
controlling one or more feed rate of at least one dewatering device of a mining system to mix a clay slurry, a flocculant, a sand tailing and an overburden to generate the engineered reclamation material having a sand to clay ratio ranging from 0.5:1 to 2.5:1 and the sand plus clay to overburden having a ratio ranging from 0.5:1 to 5.0:1 and a resulting waste;
determining the recovery of solids of the feed to the product by calculating Cwp/Cwf×(Cwf−Cww)/(Cwp−Cww); and
determining the recovery of water from the feed to the product by calculating (1−Cwp)/(1−Cwf)×((1−Cwf)/(1−Cww)/(Cwp−Cww), wherein Cwf is the solids concentration of the feed slurry, Cwp is the solids concentration of the product slurry, and Cww is the solids concentration of the waste slurry.

8. The process of claim 7, wherein the flocculant is an anionic polymer flocculant and additionally includes a coagulant.

* * * * *